April 29, 1930.  K. E. PEILER  1,756,492
APPARATUS FOR DELIVERING MOLTEN GLASS
Filed June 24, 1926
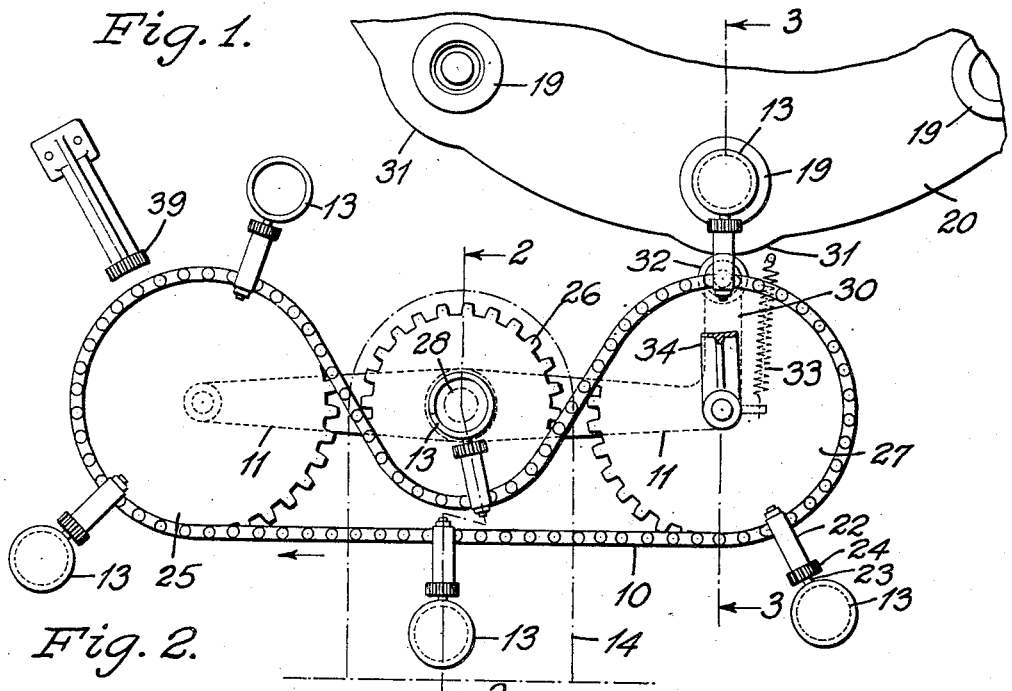
Fig. 1.
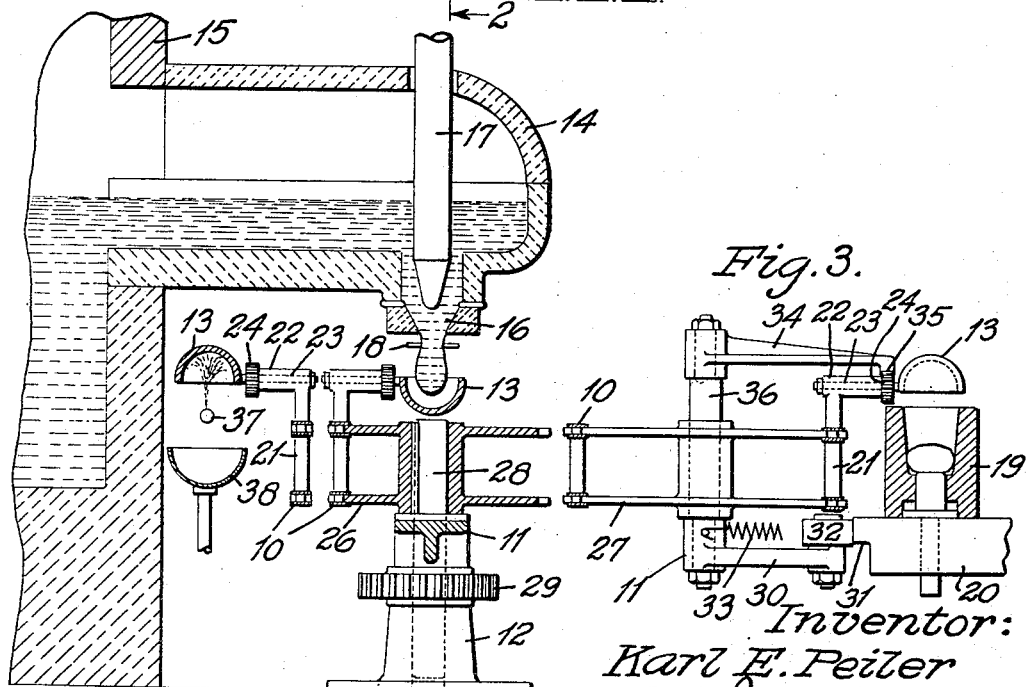
Fig. 2.
Fig. 3.
Inventor:
Karl E. Peiler
by Robson & Brown
Atty.

Patented Apr. 29, 1930

1,756,492

UNITED STATES PATENT OFFICE

KARL E. PEILER, OF WEST HARTFORD, CONNECTICUT, ASSIGNOR TO HARTFORD EMPIRE COMPANY, OF HARTFORD, CONNECTICUT, A CORPORATION OF DELAWARE

APPARATUS FOR DELIVERING MOLTEN GLASS

Application filed June 24, 1926. Serial No. 118,239.

My invention relates to mold charge delivery apparatus, and more particularly to apparatus for transferring mold charges of molten glass from a receiving station to a moving delivery station.

The invention has for an object to provide an improved transfer mechanism which is adapted to receive mold charges at a receiving station and transfer the same to a moving delivery station. This object is accomplished by providing a carriage or supporting device which is pivotally mounted at the receiving station and arranged to swing and move with the delivery station while a mold charge is being discharged at said delivery station.

Another object of the invention is to provide an improved mold charge transfer mechanism which shall be adapted to continuously move a plurality of mold charge receptacles from a stationary receiving station to a continuously moving delivery station, the travel of each receptacle being arrested at the delivery station to receive a mold charge while another receptacle on the conveyor is being simultaneously moved with the delivery station to discharge its contents at said station.

Other objects of the invention include such novel features of construction and arrangement of parts as are disclosed in the following specification and in the drawings, and as specifically set forth in the appended claims.

In the drawings:—

Figure 1 is a plan view showing a glass delivery apparatus embodying my invention;

Fig. 2 is a vertical sectional view on the line 2—2 of Fig. 1, showing a cup in charge-receiving position, and Fig. 3 is a similar view showing a section on the line 3—3 of Fig. 1, in which a cup is in delivery position above a mold.

The invention is illustrated as incorporated in an apparatus for transferring mold charges from a glass feeder to molds located on a continuously rotating mold table. The feeding and shaping machines may be of any conventional type and form no part of the present invention.

In the preferred embodiment of the invention, a carriage is mounted beneath the feeder, for pivotal movement upon a vertical axis, in alignment with the feeder outlet. This carriage is arranged to extend from the feeder to the mold table of the shaping machine and supports a continuously moving conveyor of suitable construction to carry a plurality of mold-charge receptacles. The conveyor is operated at a uniform rate of speed and the movements of the conveyor and of the carriage are coordinated in such a manner that the travel of each mold charge receptacle is arrested at the feeder outlet to receive a mold charge. After receiving the charge, the receptacle with its mold charge is conveyed to a position above the moving mold, and the mold table actuates the carriage in such a manner that the moving receptacle on the conveyor moves in coincidence with the mold on the rotating table for a sufficient time to permit the receptacle to effect the discharge of its mold charge without distorting the mold charge during its delivery into the mold.

Referring to Figs. 1 and 2 of the drawing, an endless conveyor 10 is shown as supported upon a swinging carriage or supporting member 11 which is pivotally mounted beneath the outlet of a glass feeder and upon a vertical support 12 positioned in axial alignment therewith. The conveyor is arranged to support and carry a plurality of mold-charge receptacles 13 hereinafter referred to as cups, and these may be of suitable size and shape to preform the mold charges prior to delivery into the molds of a glassware shaping machine. The glass feeder may be of any suitable construction, and is here shown convenientally as including a forehearth 14 extending from a glass melting tank 15 and provided with a discharge outlet 16. Mold charges are discharged from the outlet under the influence of an implement 17 and are cut off by cooperating shear blades indicated by the numeral 18. The shaping machines may be of any type in which a plurality of molds

19 are mounted on a continuously rotating table indicated by the numeral 20.

The endless conveyor for carrying the mold charge cups is shown as composed of upper and lower endless chains. The cups are spaced along the conveyor and each cup may be attached thereto in any suitable manner, as for example by a vertical link member 21 secured to the links of the upper and lower chains. This link member is provided with a tubular head 22 adapted to form a bearing for rotatably supporting an axle 23 which carries the cup. The cup is rotated during certain portions of its travel by means of a gear 24 mounted on the cup axle 23.

The conveyor chains are supported and driven by sprocket wheels 25, 26 and 27 which are mounted in alignment on the carriage and are of a chosen size to produce the desired results of controlling the operation of the receptacles. In the illustrated embodiment of the invention, two large sprocket wheels 25 and 27 are loosely mounted at the extremities of the carriage member 11 and the smaller sprocket gear 26 is located at the pivotal point of the carriage and in axial alignment with the feeder outlet.

The conveyor chain passes around the large sprockets 25 and 27 and in contact with one side of the intermediate sprocket 26, the latter serving as the driving sprocket for the conveyor. The driving sprocket 26 is keyed to a vertical shaft 28 journaled in the standard 12, and rotated from any convenient source of power indicated by the gear 29, which may be connected to the drive mechanism of the feeder or of the forming machine.

The extremity of the carriage adjacent to the shaping machine is provided with an extension member 30 which is arranged to be actuated by suitable cam elements 31 on the mold table adjacent to the molds thereon. The carriage member 30 is provided with a contact roller 32 and a spring 33 to hold the roller in contact with the mold table.

Mold charges are discharged from the receptacles 13 into the moving molds 19 by the combined movements of the conveyor and the carriage when the latter is actuated by the mold table.

The mechanism for operating the receptacles at the mold comprises a bracket arm 34 provided with a rack gear 35 adapted to be engaged by the gears 24 and to cause the gears 24 to rotate and invert the cup over the mold as shown in Fig. 3. The inverting cup mechanism 34 is rigidly connected to the carriage 11 by a pin 36 which may serve as the axle for the sprocket gears 27.

After each cup has been inverted over the mold and has discharged its contents, it is carried, in inverted position, until it is subsequently cooled in any suitable manner, as, for example, by directing a jet of water or other cooling fluid into the cup from a nozzle indicated by the numeral 37. A receptacle 38 may be arranged below the nozzle 37 to receive the waste cooling fluid. The cup is then restored to upright position by engagement with a rack member 39.

The operation of the apparatus described above is carried out in the following manner:

The transfer cup supports 21 pass in succession around the outside of the sprocket 26 and when each cup support travels around the gear 26, the cup is maintained below the feeder outlet for a sufficient time to receive a mold charge discharged from the feeder. The cup with its charge is then carried to the mold table, and when the cam 31, located adjacent to the receiving mold, engages the carriage arm 30, the carriage is swung about its pivot axis, thereby causing the carriage and the conveyor with the cup to swing about the shaft 28 while the conveyor is moving the cup forwardly. The combined movements of the conveyor, the carriage, and the mold are so regulated that the cup is maintained substantially coincident with the mold for a sufficient time to permit the cup to be inverted and discharge its contents into the mold. It will be noted that the carriage upon which the cups are carried is pivotally mounted at the axis of the feeder, thereby permitting the transfer mechanism to pivot about its axis during the delivery of a mold charge into the mold, at which time a receptacle may be held at the feeder outlet to obtain the charge. By this construction the successive operations of receiving and delivering mold charges may be carried out without interfering with each other.

Variations may be made in the construction herein shown and described, within the scope of the appended claims.

What I claim is:

1. In apparatus for transferring mold charges of molten glass from a charging station to a moving delivery station, the combination of a continuously moving endless flexible transfer conveyor having a plurality of mold charge receptacles mounted thereon, and means associated with the transfer conveyor for temporarily arresting the travel of each receptacle at the charging station when receiving a mold charge and for moving each receptacle in coincidence with the delivery station during the discharge of the mold charge from the receptacle.

2. In apparatus for transferring mold charges of molten glass from a charging station to a moving delivery station, the combination of a continuously moving transfer conveyor having a mold-charge receptacle mounted thereon, and means associated with the transfer conveyor for temporarily arresting the travel of the receptacle at the charging station when receiving a mold charge without altering the relation between the carrier and the receptacle and for moving the receptacle in coincidence with the delivery station during the discharge of the mold charge from the receptacle.

3. In apparatus for transferring mold charges of molten glass from a charging station to a moving delivery station, the combination of a continuously moving transfer mechanism mounted for pivotal movement on a vertical axis in substantial alignment with the charging station, mold charge receptacles mounted on said transfer mechanism, and means associated with the transfer mechanism for temporarily arresting the travel of each receptacle at the charging station when receiving a mold charge without changing the position of the receptacle on the transfer mechanism and for moving each receptacle in coincidence with the delivery station during the discharge of the mold charge from the receptacle.

4. The combination with apparatus for feeding mold charges of molten glass and a mold table, of a longitudinally moving transfer mechanism also mounted for pivotal movement as a unit about an axis in substantial alignment with the feeder outlet, mold-charge receptacles mounted on the transfer mechanism, means associated with the transfer mechanism for arresting the travel of each receptacle beneath said outlet, and means for moving the transfer mechanism on its axis to cause the receptacles to move successively in coincidence with the molds on the table.

5. In apparatus for transferring mold charges of molten glass from a mold-charge feeding station to a charge-delivery station, a carrier movably supported adjacent to the feeding station, a transfer conveyor movably mounted on the carrier, mold-charge receptacles mounted on the conveyor, means for continuously moving said conveyor to move said receptacles in succession to said feeding station and to temporarily arrest the travel of each receptacle at the feeding station, and means for thereafter moving the carrier to move the charged receptacle into coincidence with the delivery station to discharge the glass.

6. In apparatus for transferring mold charges if molten glass from a mold charge-feeding station to a charge-delivery station, a support mounted adjacent to the feeding station, a continuously movable transfer conveyor mounted on the support, mold-charge receptacles mounted on the conveyor and means for actuating the conveyor to cause the receptacles to move successively to a charge-receiving position in alignment with the axis of the support while maintaining unaltered the positions of the receptacles on the conveyor.

7. In apparatus for transferring mold charges of molten glass from a mold-charge feeding station to a charge-delivery station, a support mounted pivotally in axial alignment with the feeding station, a transfer conveyor movably mounted on the support, mold charge receptacles carried by the conveyor, means for continuously moving said conveyor to cause said receptacles to move successively between a charge-receiving position at said feeding station and a position adjacent to said delivery station, and means for periodically moving said support about its pivot to maintain each receptacle temporarily in alignment with a moving mold at said delivery station.

8. In apparatus for delivering mold charges of molden glass from a feeder outlet to a continuously moving mold table, a carrier pivotally mounted in axial alignment with the outlet, a transfer conveyor movably mounted on the carrier, mold charge receptacles mounted on the conveyor, means for continuously moving said conveyor, and for directing the movement of said conveyor to bring the receptacles successively to the axis of the transfer conveyor to receive a mold charge, and means for directing the movement of the carrier to bring the charged receptacles successively to position to discharge their charges at a delivery station on said moving mold table.

9. In apparatus for transferring mold charges of molten glass from a mold-charge feeding station to moving molds, a mold-charge transfer conveyor, a plurality of mold-charge receptacles mounted on the conveyor, means for moving said conveyor to bring said receptacles successively to said feeding station to receive mold charges and thereafter to bring each charged receptacle above a moving mold, and means for then moving the conveyor during its first named movement to cause said receptacle to move with its mold while discharging its mold charge into that mold.

10. The combination with apparatus for feeding mold charges of molten glass and a continuously moving mold table, of a carrier mounted for pivotal movement upon an axis in axial alignment with the feeder outlet, a plurality of mold charge receptacles mounted on the carrier and adapted to move continuously independently of the pivotal movement of the carrier and in succession to a position beneath the feeder outlet and thence to a position above the path of movement of the molds on the mold table, means for directing the travel of the receptacles so that each receptacle will be maintained beneath the feeder outlet for a substantial period of time while the entire series of receptacles remains in motion, and means for actuating said carrier to cause the receptacles to travel coincidently with the molds while delivering mold charges thereto.

11. Apparatus for transferring mold charges of molten glass from a glass feeder having a discharge outlet to a moving mold device, comprising a frame support extending from the feeder to the mold device, sprocket wheels mounted at each end of the frame, a conveyor chain supported and operated by the sprockets, a plurality of mold charge transfer cups mounted on the conveyor chain, said transfer cups arranged to travel continuously from the feeder to the mold, means associated with the frame for arresting the travel of a cup relative to the feeder outlet to receive a mold charge, and means associated with said mold for operating the cup to discharge its contents into the mold while the conveyor is moving.

12. Apparatus for transferring mold charges of molten glass from a glass feeder having a discharge outlet to a moving mold device, a supporting frame, a hub mounted at each end of the frame, each of said hubs carrying a pair of sprocket wheels spaced apart, a chain conveyor having upper and lower chains, said chains carried by said sprockets, a vertical bracket geared to the upper and lower chains, a mold charge transfer cup mounted on an upper extension of said bracket, means associated with the frame for positioning the cup at the outlet to receive a mold charge, and means associated with the frame for inverting the cup at the mold to discharge its contents into said mold.

13. Apparatus for transferring mold charges of molten glass from a glass feeder having a discharge outlet to a moving mold device, a supporting frame, a hub mounted at each end of the frame, each of said hubs carrying a pair of sprocket wheels spaced apart, a chain conveyor having upper and lower chains, said chains carried by said sprockets, a vertical bracket secured to the upper and lower chains, a mold charge transfer cup mounted on an upper extension of said bracket, means associated with the frame for positioning the cup at the outlet to receive a mold charge, means associated with the frame for inverting the cup at the mold to discharge its contents into said mold, and means associated with the mold for causing the cup to travel with the mold during the discharge of the mold charge.

14. Apparatus for transferring mold charges of molten glass from a glass feeder having a discharge outlet to a moving mold device, a supporting frame, a hub mounted at each end of the frame, each of said hubs carrying a pair of sprocket wheels spaced apart, a chain conveyor having upper and lower chains, said chains carried by said sprockets, a vertical bracket geared to the upper and lower chains, a mold charge transfer cup mounted on an upper extension of said bracket, means associated with the frame for positioning the cup at the outlet to receive a mold charge, means associated with the frame for inverting the cup at the mold to discharge its contents into said mold, and means for restoring the cup to upright position prior to the next presentation to the feeder outlet.

15. Apparatus for transferring mold charges of molten glass from a glass feeder having a discharge outlet to a moving mold device, comprising a frame support extending from the feeder to the mold device, sprocket wheels mounted at each end of the frame, a conveyor chain supported and operated by the sprockets, a vertical bracket secured to the conveyor chain, a bearing provided on an upper extension arm of said bracket, a mold charge transfer receptacle mounted on an axle in said bearing, a gear mounted on the axle, a rack gear located near the mold and adapted to engage the axle gear to invert the cup and discharge its contents into the mold, and a rack gear for restoring the cup to upright position prior to receiving a mold charge at the outlet.

16. Apparatus for transferring successive mold charges of molten glass from a glass feeder having a discharge outlet to a continuously rotating mold table having a plurality of molds mounted thereon, which comprises a frame support extending from the feeder to the mold table, sprocket wheels mounted on the frame at each end thereof, a conveyor chain supported and operated by the sprockets, a plurality of mold charge transfer cups mounted on the conveyor chain and spaced apart thereon, said conveyor arranged to travel continuously from the feeder to the mold table, means associated with the frame for arresting the travel of a cup relative to the feeder outlet to receive a mold charge, and means associated with each mold on the mold table for operating another cup on the conveyor to discharge its contents into the mold while the conveyor is moving.

17. The combination with a rotary mold table having molds thereon and a glass feeder having a delivery outlet located laterally of the mold table, a conveyor, a plurality of spaced transfer receptacles carried by the conveyor and movable continuously therewith, means for supporting and moving said conveyor to cause the said successive transfer receptacles to each be maintained in a mold charge receiving position with respect to the feeder outlet for a substantial period of time during the continued movement of the conveyor and then to move to a position above the path of movement of a mold on said mold table, and means for moving said conveyor support to cause each transfer receptacle to travel for a substantial distance in register with said mold during the continued movement of the conveyor by said first-named conveyor moving means.

18. The combination with a rotary mold table having molds thereon and a glass feeder having a delivery outlet located laterally of the mold table, a flexible conveyor, a plurality of spaced transfer receptacles carried by the conveyor and movable therewith, means for supporting and moving said conveyor to cause the successive transfer receptacles to each be maintained in a mold charge receiving position with respect to the feeder outlet for a substantial period of time during the continued movement of the conveyor and then to move to a position above the path of movement of a mold on said mold table, and means for moving said conveyor support to cause each transfer receptacle to travel for a substantial distance in register with said mold during the continued movement of the conveyor by said first-named conveyor moving means.

19. In glass working machinery, a glass feeder having a downwardly opening delivery outlet, a longitudinal carrier supported intermediate its ends below said feeder outlet, an endless flexible conveyor, means on the ends of said carrier for movably supporting said conveyor, spaced transfer cups carried by said conveyor at one side thereof, and means for actuating said conveyor and for guiding it during part of its travel for movement in an arc of a circle about the axis of said feeder outlet so that each transfer cup will be maintained directly underneath said feeder outlet during the continued movement of the conveyor for that part of its travel.

20. In glass working machinery, a glass feeder having a downwardly opening delivery outlet, a longitudinal carrier supported intermediate its ends below said feeder outlet, an endless flexible conveyor, means on the ends of said carrier for movably supporting said conveyor, spaced transfer cups carried by said conveyor at one side thereof, means for actuating said conveyor and for guiding it during part of its travel for movement in an arc of a circle about the axis of said feeder outlet so that each transfer cup will be maintained directly underneath said feeder outlet during the continued movement of the conveyor for that part of its travel, and means for causing each of said transfer cups to discharge its contents at a delivery station.

21. The combination with a rotary mold table having molds thereon and a glass feeder having a delivery outlet located laterally of the mold table, of a pivoted carrier adjacent to the mold table and partially below the feeder outlet, an endless conveyor mounted for movement on the carrier, transfer cups movable successively with the conveyor from a position to receive a mold charge from the feeder outlet to a position above the path of movement of a mold on said table, and means for periodically swinging said carrier about the axis of its pivot to cause each transfer cup to be moved by said conveyor after reaching said last-named position in register with one of said molds for a substantial distance to permit discharge of the contents of said cup into said mold.

22. In glass working machinery, the combination with a container for molten glass having a downwardly opening glass discharge outlet, a receptacle for glass, a continuously moving endless flexible carrier to which said receptacle is secured, a wheel arranged on a vertical axis about which said flexible carrier passes, and additional means for guiding said flexible carrier through a horizontal path, a portion of which is substantially the arc of a circle having as its center a point in vertical alignment with said outlet and as its radius the horizontal distance between the center of said receptacle and its point of connection with said flexible carrier, whereby said receptacle will be maintained for a substantial period of time in alignment with said outlet.

Signed at Hartford, Connecticut, this 23rd day of June, 1926.

KARL E. PEILER.